United States Patent [19]
Cortner, Jr.

[11] Patent Number: 5,447,122
[45] Date of Patent: Sep. 5, 1995

[54] DUSTING DEVICE FOR LIVESTOCK

[76] Inventor: William C. Cortner, Jr., R.R. 3, Box 155-C, Maysville, Mo. 64469

[21] Appl. No.: 254,259

[22] Filed: Jun. 6, 1994

[51] Int. Cl.⁶ .............................................. A01K 29/00
[52] U.S. Cl. ................................................... 119/159
[58] Field of Search ............................... 119/156, 159

[56] References Cited

U.S. PATENT DOCUMENTS

| | | | |
|---|---|---|---|
| 2,653,575 | 9/1953 | Worden | 119/159 |
| 2,702,020 | 2/1955 | Worden | 119/159 |
| 3,777,716 | 12/1973 | Cortner, Jr. | |
| 3,902,461 | 9/1975 | Cortner, Jr. | |
| 3,972,309 | 8/1976 | Cortner, Jr. | |
| 4,079,700 | 3/1978 | Eshnaur et al. | |
| 4,130,092 | 12/1978 | Eshnaur et al. | 119/159 |

Primary Examiner—Gene Mancene
Assistant Examiner—Thomas Price
Attorney, Agent, or Firm—Shook, Hardy & Bacon

[57] ABSTRACT

A dusting device for applying powdered insecticide to animals has a bag with opposing side panels and a bottom portion. The bottom portion accommodates the flow of insecticide therethrough. Two cartridge receiving compartments are adopted to allow insecticide to flow therethrough and are disposed inside of the bag. Each compartment has opposing side panels, a load opening for inserting a cartridge, and a bottom portion disposed above the bottom portion of the bag. The compartments are laterally oriented with respect to each other such that the side panels of one of the compartments are disposed generally in an end-to-end orientation with the side panels of the other compartment.

20 Claims, 2 Drawing Sheets

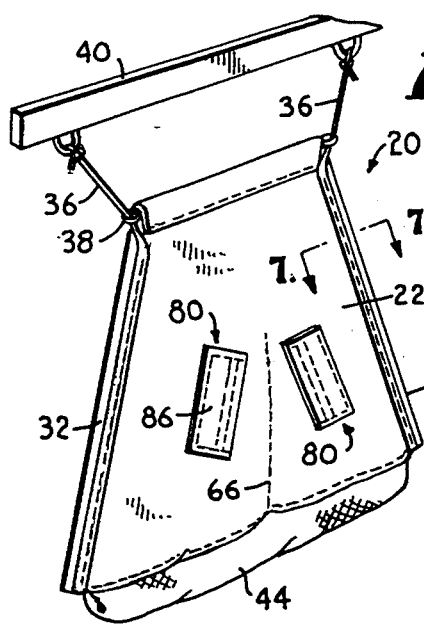
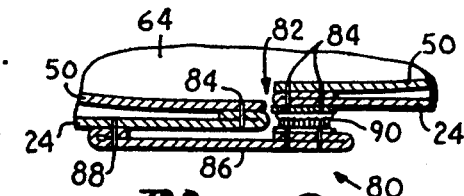
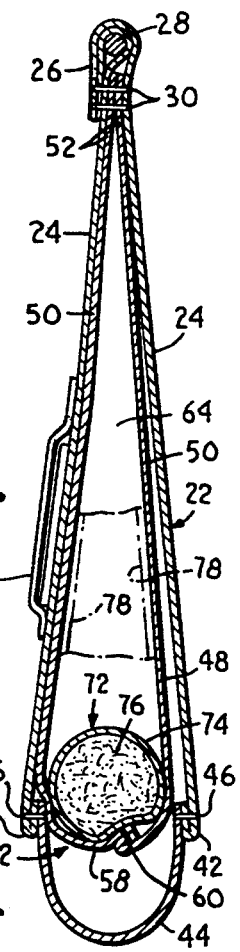
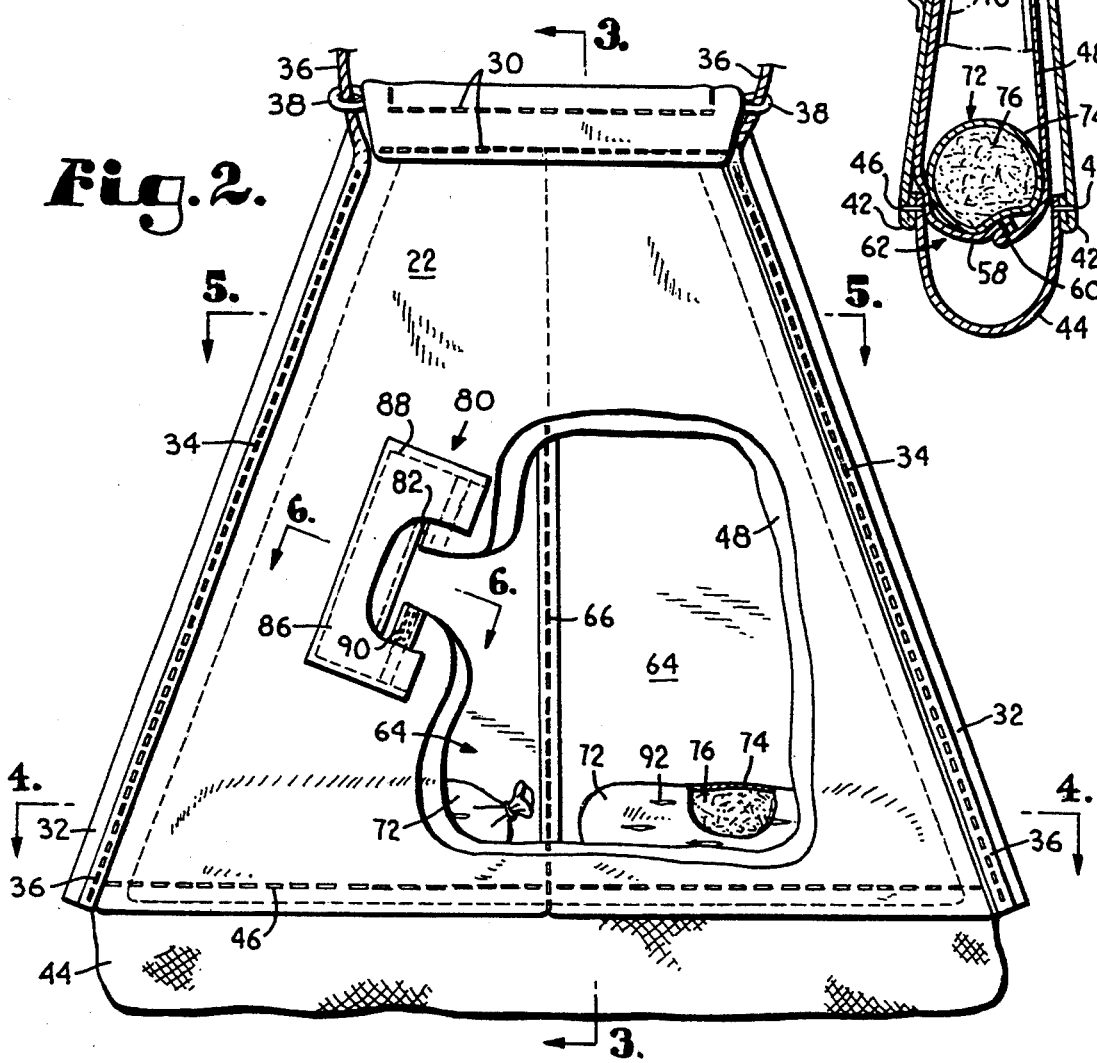

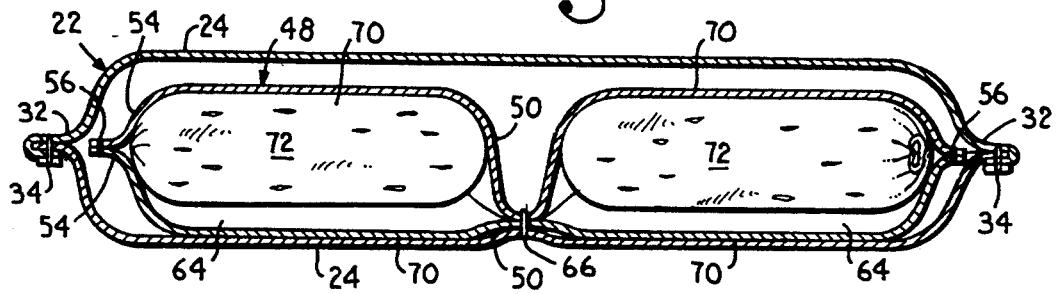
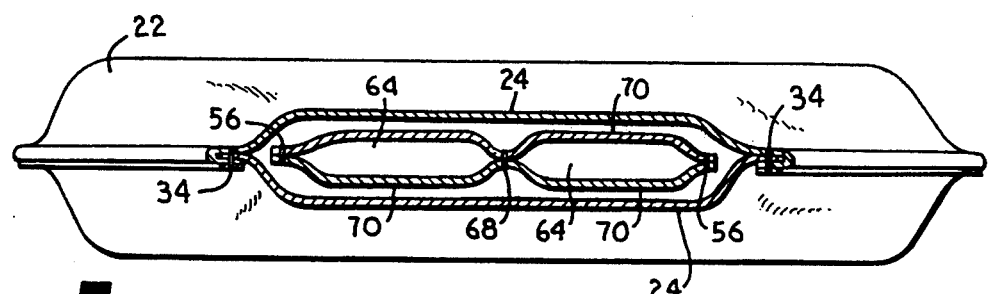
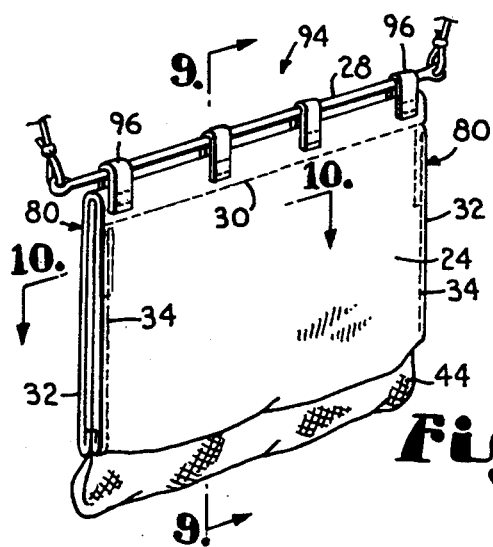
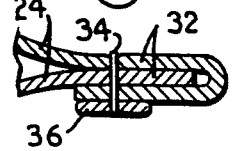
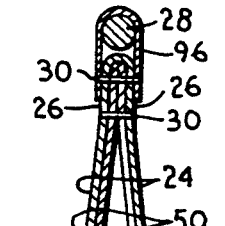
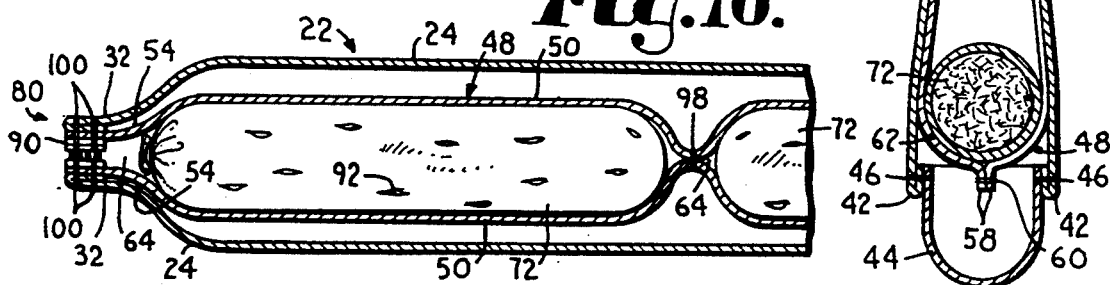

5,447,122

DUSTING DEVICE FOR LIVESTOCK

BACKGROUND OF THE INVENTION

1. Field of the Invention

The present invention is directed to a dusting device for applying powdered insecticide to animals. Particularly, the device has a novel structure including at least two cartridge receiving compartments laterally oriented with respect to each other.

2. Description of the Prior Art

Various types of dusting devices have been developed to hold powder insecticide to apply to livestock. Insecticide cartridges are usually used to load the insecticide into the devices. The cartridges are usually cylindrical and oblong in shape and have an outer layer of a waterproof material. A cartridge is loaded into a dusting device and then punctured by a rancher or farmer such that the insecticide flows out of the cartridge. An example of this type of device is depicted in U.S. Pat. No. 4,130,092. This patent discloses a device for receiving an insecticide cartridge wherein the device has a water-resistant outer bag and an inner bag with mesh openings to allow insecticide to flow therethrough. The bottom of the outer bag also has mesh openings to allow the flow of insecticide to an animal brushing up against the bag.

In the livestock industry, synthetic insecticides, which are normally used in dusting devices, usually have an effective life of approximately two years. That is, after two years of applying the synthetic insecticide to insects in a particular herd of animals, the insects tend to build up resistance to the insecticide. Thus, after a couple of years, the insecticide is no longer effective to control insects.

It has been found that applying two different insecticides to a herd of livestock at one time can inhibit the insects' abilities to build up resistance to either one of the insecticides. Thus, two different insecticides are sometimes marketed together in two separate cartridges. The rancher or farmer usually places one cartridge containing a first synthetic insecticide in the dusting device and punctures it, and then places a second cartridge containing a second synthetic insecticide on top of the first cartridge and punctures the second cartridge. Thus, the two insecticides intermix within the device, and the second insecticide tends to be disposed on top of the first insecticide. This arrangement does not allow effective application of the two different insecticides at the same time because the second insecticide tends only to be dispensed from the bag after the first insecticide has been dispensed. Furthermore, insecticides sometimes are volatile and dangerous when directly combined with other insecticides. The combination can possibly be harmful to both livestock and persons loading the device. Further, the possibility exists that the two different insecticides may be incompatible such that if intermixed in a single compartment, the effectiveness of one or both could be decreased.

U.S. Pat. No. 3,777,716 discloses a dust bag wherein two cartridges are positioned within the interior of a dusting device. However, as described above, insecticide in the two cartridges will intermix because they are contained within the same enclosure. Thus, if the insecticides are of two different types, the possible harmful effects of their mixing together is present.

Additionally, the dusting devices described above do not offer a rancher or farmer versatility in changing between different insecticides. For instance, at particular times of the year it may be advantageous to use one particular insecticide, and at other times it may be advantageous to use another particular insecticide. In order to avoid the possible hazards of intermixing the insecticides, the rancher or farmer would have to either provide a second dusting device, or wait until the insecticide contained within the device is completely dispensed before inserting a different insecticide. The above devices do not offer the versatility needed to apply different insecticides either at the same time, or at different times to effectively control insects.

U. S. Pat. No. 3,902,461 discloses a dusting device having a "saddle bag" type arrangement with two different chambers which can receive insecticide cartridges. The device in the patent has two water-resistant outer flaps disposed over a supporting rope. Positioned on the interior of each of the flaps is a mesh bag structure which forms the chamber in which the insecticide is disposed. When the device is in use with both chambers filled with insecticide, the inner mesh bags contact and overlap each other along substantially there entire length. Thus, if different insecticides were used in different chambers, there could be a substantial amount of intermingling between the insecticides because the chambers lie in such a close relationship.

Furthermore, because of the "saddle bag" arrangement, the ends of the device are open and can be penetrated by moisture, the moisture inhibiting the effectiveness and dispensing characteristics of the insecticide. Still further, the chambers of the device of the patent are difficult to load because they require the "flipping up" of one flap in order to load the chamber on the other flap, and vice versa.

Thus, a dusting device is needed which substantially prevents intermingling of two different insecticides when they are in the device and which can effectively apply the insecticide to livestock. Further, a device is needed which easily, effectively, and safely allows a rancher or farmer to apply different insecticides at different times. Also, a device is needed which can apply two different insecticides such that moisture is unlikely to affect the dispensability or effectiveness of the insecticides.

SUMMARY OF THE INVENTION

An object of the invention is to provide a dusting device which can simultaneously apply two different insecticides without intermingling the insecticides when they are in the device.

Another object of the invention is to provide a dusting device which offers a rancher or farmer versatility in applying different insecticides.

A further object of the invention is to provide a dusting device which inhibits moisture from contacting insecticides contained in the device.

According to the present invention, the foregoing and other objects are obtained by a dusting device having a bag with opposing side panels and a bottom portion. The bottom portion accommodates the flow of insecticide therethrough. At least two cartridge receiving compartments are adopted to allow insecticides to flow therethrough and are disposed inside of the bag. Each of the compartments have opposing side panels, a load opening for inserting a cartridge, and a bottom portion disposed above the bottom portion of the bag. The compartments are laterally oriented with respect to each other such that the side panels of one of the compartments are disposed generally in an end-to-end orientation with the side panels of the other compartment.

In accordance with another aspect of the invention, the device can be provided where the compartments are formed by a single inner bag having opposing side panels and a substantially vertical stitch line. The stitch line connects the opposing side panels of the inner bag at a location intermediate the ends of the opposing side panels such that the compartments are formed. Further, the inner bag can be attached to one of the side panels of the outer bag along a portion of the vertical stitch line.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 1 is a top perspective view of a dusting device embodying the present invention.

FIG. 2 is a front elevational view of the dusting device of FIG. 1, structure being broken away to reveal the details of construction.

FIG. 3 is a cross section taken along line 3—3 of FIG. 2 and partially showing the double wall construction of the cartridge receiving compartment in phantom.

FIG. 4 is a detailed cross section taken along line 4—4 of FIG. 2.

FIG. 5 is a detailed cross section taken along line 5—5 of FIG. 2.

FIG. 6 is a fragmentary, detailed cross section taken along lines 6—6 of FIG. 2 and showing the construction of the load opening.

FIG. 7 is a fragmentary, detailed cross section taken along line 7—7 of FIG. 1.

FIG. 8 is a top perspective view of a dusting device that is a further embodiment of the present invention.

FIG. 9 is a detailed cross section taken along line 9—9 of FIG. 8, and partially showing the double wall construction of the cartridge receiving compartment in phantom.

FIG. 10 is a fragmentary, detailed cross section taken along line 10—10 of FIG. 8.

DETAILED DESCRIPTION OF THE PREFERRED EMBODIMENTS

With reference to FIGS. 1-7, the construction of dusting device 20 will be described. Outer bag 22 of device 20 has opposing side panels 24. Panels 24 have upper edges 26 which overlap one another and are positioned around rigid supporting rod 28. Upper edges 26 are held together and around rod 28 by stitching arrangement 30.

With particular reference to FIGS. 2 and 7, panels 24 are stitched together along their side edges 32 by stitch lines 34. Further, supporting ropes 36 are also stitched to edges 32 by stitch lines 34. With reference to FIGS. 1 and 2, supporting ropes 36 are stitched along the entire length of edges 32 and extend upwardly through eyelets 38 in rod 28. Ropes 36 are then attached to support beam 40. With reference to FIG. 7, one of panels 24 is of a greater length than the other panel 24 such that it can be overlapped around the edge of the other panel and stitched in the arrangement shown in FIG. 7.

As shown in FIG. 3, bottom edges 42 of panels 24 are attached to mesh bottom portion 44 along stitch lines 46. Thus, an enclosure is formed by panels 24 and bottom portion 44. Edges 42 are overlapped upon themselves to create a reinforced attaching structure for bottom portion 44.

Panels 24 are preferably made of a water-resistant material, for example, canvas. Bottom 44 is preferably made of a material having fairly large mesh openings therein to allow the passage of insecticide therethrough.

With reference to FIGS. 2-5, inner bag 48 has opposing side panels 50. Panels 50 are positioned inside of and generally parallel to panels 24 of outer bag 22. Upper edges 52 of panels 50 are connected to each other and to upper edges 26 of panels 24 by stitching arrangement 30, as best shown in FIG. 3. Thus, edges 52 are layered between upper edges 26 of panels 24 and secured in place by stitching arrangement 30.

With reference to FIGS. 4 and 5, side edges 54 of panels 50 are connected along their entire length by stitch lines 56. Further, bottom edges 58 of panels 50 are connected together along stitch line 60 to form bottom portion 62 as shown in FIG. 3.

Additionally, upper portions of edges 54 of panels 50 can be attached to edges 32 of panels 24 along a portion of stitch line 34. Thus, edges 32 and edges 54 can all be held together along a portion of stitch line 34, if desired.

With reference to FIGS. 1, 2, 4, and 5, a separating arrangement for forming cartridge receiving compartments 64 will be described. In the lower portions of inner bag 48, substantially vertical stitch line 66 is used to separate inner bag 48 into two compartments 64. Stitch line 66 extends from bottom edges 58 upwardly to a location approximately two-thirds of the way up panels 50. With particular reference to FIG. 4, stitch line 66 further extends through and attaches panels 50 to one of panels 24 along the length of stitch line 66. The length of stitch line 66 is best shown in FIG. 1. With particular reference to FIG. 5, bag 48 is further separated above stitch line 66 by stitch line 68. Stitch line 68 extends from the end of stitch line 66 upwardly to edges 52 of panels 50. However, stitch line 68 only connects panels 50 and does not attach them to either of panels 24. Thus, stitch lines 66 and 68 are used to separate inner bag 48 into two completely separate compartments 64.

With particular reference to FIGS. 4 and 5, each compartment 64 has its own opposing side panels 70 formed from portions of panels 50 of inner bag 48. Compartments 64 are laterally oriented with respect to each other such that panels 70 of one of compartments 64 are disposed generally in an end-to-end orientation with respect to other panels 70 of other compartment 64. Also, bottom portion 62 of bag 48 is thus separated to form a bottom portion for each compartment 64.

With reference to FIGS. 2-5, each compartment 64 can receive oblong generally cylindrical insecticide cartridge 72. Cartridges 72 have outer walls 74 which are preferably made of a waterproof material, for example, plastic, such that insecticide 76 is protected during shipment of cartridge 72. When each compartment 64 has a cartridge 72 positioned therein, cartridges 72 lie in a generally end-to-end orientation with respect to each other, as best shown in FIGS. 2 and 4.

Panels 50 of bag 48, and thus panels 70 of each compartment 64, are made of a material with mesh openings, preferably burlap, which allows the insecticide to flow out of the compartments. With reference to FIG. 3, panels 50 of bag 48, and thus panels 70 of compartments 64, can be made with additional inner wall 78 such that they have a double wall construction. Inner panel 78 is also made of a material having mesh openings, preferably burlap, to allow insecticide to flow out of the compartments.

With reference to FIGS. 1-3 and 6, each compartment 64 has a load opening 80 which will be described below. With particular reference to FIG. 6, load opening 80 includes slit 82 which extends through both panel 24 and panel 50 into the interior of compartment 64. Panel 24 and panel 50 are stitched together by stitch lines 84 on both sides of slit 82. Furthermore, the edges of panels 24 that form slit 82 are folded under for attachment to panels 50 to form a reinforced portion. Cover flap 86 is stitched to panel 24 by stitch line 88. Stitch line 88 extends along three sides of flap 86 such that flap 86 can prevent moisture from entering slit 82. Velcro fastener 90 is positioned on the outside surface of panel 24 and on the inside surface of flap 86. Fastener 90 extends the entire length of flap 86 on the side of flap 86 that is not attached by stitch line 88. Thus, when fastener 90 is closed, flap 86 completely seals slit 82 to prevent penetration of moisture into compartment 64. Slit 82 is oriented on an inclination of between approximately 10° and 30° from vertical. This orientation reduces the stresses on velcro fastener 90 such that when compartment 64 receives a cartridge 72, fastener 90 will not pull open because of the weight of cartridge 72. The orientation of the slit in combination with flap 86 also prevents moisture from entering compartment 64 during inclement weather.

With reference to FIGS. 1-3, and 6, the operation of dusting device 20 will be described. One of load openings 80 is first opened and a cartridge 72 is received through slit 82 and into one of compartments 64. Cartridge 72 lays along the bottom portion of compartment 64 in a generally horizontal orientation. The rancher or farmer then inserts his or her hand through slit 82 and punctures outer wall 74 of cartridge 72 at numerous locations as indicated by reference numeral 92. Thus, insecticide 76 is allowed to flow out of cartridge 72 and into compartment 64. Another cartridge is loaded into the other compartment 64 in an identical manner. Cartridges 72 are loaded in dusting device 20 such that they are in an end-to-end orientation. When an animal agitates the device, powdered insecticide 76 flows through the bottom portion of compartments 64 and through bottom portion 44 of outer bag 22 and onto the animal.

Thus, compartments 64 can be loaded with different types of insecticide, such insecticides being applied evenly and simultaneously by the dusting device. Because compartments 64 are separated and laterally oriented such that side panels of one compartment do not lie directly adjacent to or overlap the side panels of another compartment, insecticides received in the compartments are substantially prevented from intermingling while in the compartments. Therefore, the possible harmful effects of the unwanted combination of chemicals can be avoided. Further, the insecticides are separated into separate compartments such that if they are incompatible, one will not decrease the effectiveness of the other.

The two compartments allow the rancher or farmer versatility in using different insecticides at different times of the year. For example, the rancher can use an insecticide cartridge in only one compartment for a portion of the year, and at the time when a second insecticide would be most effective, he or she could insert the second insecticide in the other compartment. Thus, the rancher does not have to wait until the first insecticide has been used up, empty the device of the first insecticide, or use another dusting device. Therefore, the dual compartments allow great versatility and economic feasibility to the rancher.

With reference to FIGS. 8-10, another embodiment of the present invention is shown. Structures in dusting device 94 similar to those in dusting device 20 are designated by the same reference numerals used to describe device 20. Outer bag 22 is generally rectangular in shape and is made of a water-resistant material, for example, canvas. Bag 22 has side panels 24 which are connected at the top by stitching arrangement 30. Panels 24 are formed of a single piece of material which is folded in the center to form each of the panels, as shown in FIG. 9. Edges 32 of panels 24 are connected by stitch lines 34 along the length of edges 32, except for at an upper portion which forms load opening 80 which will be described in more detail below. Mesh bottom portion 44 is attached to bottom edges 42 of panels 24 by stitch lines 46. Thus, panels 24 and bottom portion 44 form an outer enclosure. Supporting straps 96 are attached to upper edges 26 of panels 24 such that supporting rod 28 can be received through apertures formed by straps 96.

Inner bag 48 is disposed inside of outer bag 22. Inner bag 48 has opposing side walls 50 which are generally parallel to panels 24. Panels 50 are connected along their upper edges to each other and to panels 24 by stitching arrangement 30 as shown in FIG. 9. Panels 50 are connected along their bottom edges 58 by stitch line 60 to form bottom portion 62. Substantially vertical stitch line 98 connects panels 50 together at their centers to form two cartridge receiving compartments 64. In contrast to dusting device 20, no portion of stitch line 98 is attached to either of panels 24. Stitch line 98 extends the entire height of panels 50 to completely separate compartments 64. As with device 20, panels 50 also are made of a material with mesh openings, preferably burlap, such that insecticide can pass therethrough. Further, panels 50 can have additional inner panels 78, also preferably made of burlap, such that each compartment 64 will have a double wall construction.

Load openings 80 for compartments 64 will be described with particular reference to FIGS. 8 and 10. Openings 80 are on the upper portions of edges 32 of panels 24 and the upper portions of edges 54 of panels 50. Openings 80 extend downward along these edges approximately a third of the height of device 94. In the area of openings 80, panels 24 are stitched to adjacent panels 50 by stitching arrangements 100 as shown in FIG. 10. Velcro fastener 90 is positioned in between the stitched together combinations. Thus, fastener 90 can be opened to provide access to compartment 64. Below openings 80, edges 32 of panels 24 are stitched together by stitch line 34. Further, also below openings 80, edges 54 of panels 50 are stitched to each other by a vertical stitch line (not shown) separate from stitch line 34. Thus, compartments 64 are free from outer bag 22 except for in the vicinity of load openings 80.

Dusting device 94 operates in the same manner as dusting device 20 described above. Device 94, however, has the different load opening structure and the different shape.

It will be understood that variations and changes in the details, materials, and arrangement of the parts which have been herein described and illustrated in order to explain the nature of the invention, may be made by those skilled in the art within the principles and scope of the invention.

I claim:

1. A device for applying powdered insecticide to animals and adapted to receive cartridges containing the insecticide wherein the cartridges when punctured permit flow of the insecticide, the device comprising:

a bag having opposing side panels and a bottom portion, said bottom portion accommodating the flow of insecticide therethrough; and at least two cartridge receiving compartments adapted to allow insecticide to flow therethrough and disposed inside of said bag, each of said compartments having opposing side panels, a load opening for inserting a cartridge, and a bottom portion disposed above said bottom portion of said bag, and wherein said compartments are laterally oriented with respect to each other such that said side panels of one of said compartments are disposed generally in an end to end orientation with said side panels of said other compartment.

2. The device of claim 1, wherein said compartments are formed by a single inner bag having opposing side panels and a substantially vertical stitch line, said stitch line connecting said opposing side panels of said inner bag at a location intermediate the ends of said opposing side panels such that said compartments are formed.

3. The device of claim 2, wherein said inner bag is attached to one of said side panels of said outer bag along a portion of said vertical stitch line.

4. The device of claim 1, wherein said side panels of said compartments and said bottom portions of said compartments are made of a material having mesh openings for allowing insecticide to flow out of said compartments.

5. The device of claim 4, wherein each of said side panels of said compartments has a double wall construction.

6. The device of claim 1, wherein said opposing side panels of said bag are made of a water-resistant material.

7. The device of claim 6, wherein said bottom portion of said bag is made of a material having mesh openings for allowing insecticide to flow out of said bag.

8. The device of claim 1, wherein each load opening for each compartment extends through said bag.

9. The device of claim 8, wherein each load opening is in the form of a slit through one of said panels of said bag and one of said panels of said compartment, said slit oriented at an inclination of between approximately 10° and 30° from vertical.

10. The device of claim 1, wherein the insecticide cartridges for use in the device are oblong in shape and are positioned generally in an end to end orientation when they are received in their respective compartment.

11. A device for applying powdered insecticide to animals and adapted to receive cartridges containing the insecticide wherein the cartridges when punctured permit flow of the insecticide, the device comprising:

an outer bag having opposing side panels and a bottom portion, said bottom portion accommodating the flow of insecticide therethrough;

an inner bag disposed inside of said outer bag and accommodating the flow of insecticide therethrough, said inner bag having a bottom portion and opposing side panels disposed inside of and generally parallel to said opposing side panels of said outer bag; and separating means for separating said inner bag into two separate compartments such that insecticide placed in one of said compartments will not intermingle with insecticide placed in the other of said compartments when the insecticides are in their respective compartments, each of said compartments having a load opening for inserting a cartridge into said compartment.

12. The device of claim 11, wherein said separating means is a stitch line.

13. The device of claim 12, wherein said stitch line attaches said inner bag to a portion of one of said side panels of said outer bag.

14. The device of claim 11, wherein said inner bag is made of a material having mesh openings for allowing insecticide to flow out of said inner bag.

15. The device of claim 14, wherein said inner bag has a double wall construction.

16. The device of claim 11, wherein said opposing side panels of said outer bag are made of a water-resistant material.

17. The device of claim 16, wherein said bottom portion of said outer bag is made of a material having mesh openings for allowing insecticide to flow out of said outer bag.

18. The device of claim 11, wherein the insecticide cartridges for use in the device are oblong in shape and are positioned generally in an end to end orientation when they are received into their respective compartment.

19. A device for applying powdered insecticide to animals and adapted to receive oblong cartridges containing the insecticide wherein the cartridges when punctured permit flow of the insecticide, the device comprising:

an outer bag having water-resistant opposing side panels and a bottom portion, said bottom portion accommodating the flow of insecticide therethrough;

an inner bag disposed inside of said outer bag and accommodating the flow of insecticide therethrough, said inner bag having a bottom portion and opposing side panels disposed inside of and generally parallel to said opposing side panels of said outer bag; and separating means for separating said inner bag into two sperate compartments such that insecticide placed in one of said compartments will not intermingle with insecticide placed in the other of said compartments when the insecticides are in their respective compartments, each of said compartments having opposing side walls and a load opening for inserting an oblong cartridge into said compartment, and wherein said compartments are laterally oriented with respect to each other such that said side panels of one of said compartments are disposed generally in an end to end orientation with said side panels of said other compartment and wherein the oblong insecticide cartridges are positioned generally in an end to end orientation when they are received into their respective compartment.

20. The device of claim 19, wherein said separating means is a stitch line.

* * * * *